United States Patent  [11] 3,624,036

| [72] | Inventor | George T. Kekish |
| | | Chicago, Ill. |
| [21] | Appl. No. | 794,352 |
| [22] | Filed | Jan. 27, 1969 |
| [45] | Patented | Nov. 30, 1971 |
| [73] | Assignee | Nalco Chemical Company |
| | | Chicago, Ill. |
| | | The portion of the term of the patent subsequent to July 22, 1986, has been disclaimed. |

[54] INVERT EMULSION POLYMERIZATION OF ACROLEIN UTILIZING COMMERCIAL MONOMER
7 Claims, No Drawings

| [52] | U.S. Cl. | 260/67 |
| [51] | Int. Cl. | C08f 3/40 |
| [50] | Field of Search | 260/67 U |

[56] References Cited
UNITED STATES PATENTS

| 2,657,192 | 10/1953 | Miller et al. | 260/67 |
| 3,069,389 | 12/1962 | Welch | 260/67 |
| 3,142,661 | 7/1964 | Brendlein et al. | 260/67 |
| 3,189,577 | 6/1965 | Ryder et al. | 260/67 |
| 3,235,524 | 2/1966 | Kern et al. | 260/29.6 |
| 3,457,230 | 7/1969 | Kekish | 260/67 |

*Primary Examiner*—William H. Short
*Assistant Examiner*—L. M. Phynes
*Attorneys*—Johnston, Root, O'Keefe, Keil, Thompson and Shurtleff, John S. Roberts, Jr., John G. Premo, Charles W. Connors and Morando Berrettini ABSTRACT: The present invention is directed towards an invert emulsion process for the polymerization of an $\alpha,\beta$ ethylenically unsaturated aldehyde, and in particular is directed to the homopolymerization of an acrolein-water mixture which permits the use of commercial acrolein monomer containing 100–1,000 p.p.m. of a quinone-type inhibiter such as hydroquinone. Specifically this process is an improvement over U.S. Pat. No. 3,069,389 Welch (Union Carbide) by the selection of a specific determinative $C_5$–$C_8$ saturated aliphatic cut or individual alkane components thereof such as n-pentane, n-hexane, n-heptane, n-octane, and corresponding branched chain compounds such as iso-octane as the nonaqueous diluent or nonsolvent. This is coupled with a specific redox catalyst system embodying a dual oxidant consisting of persulfate/hydroperoxide and a reducing component consisting of polyacrolein bisulfite adduct. Increased commercial yields ranging up to 40 percent over prior art processes as well as clean directly usable polymer are obtained. Additionally, the utilization of commercially inhibited acrolein monomer assists in safety regimen involving tank car transporting acrolein since the hydroquinone inhibitor damps the potential explosive qualities of the monomer. Finally, the lack of necessity of removing hydroquinone from the input to the polymerization deletes a cost step from the former process.

INVERT EMULSION POLYMERIZATION OF ACROLEIN UTILIZING COMMERCIAL MONOMER

THE INVENTION

Historically, in the literature it is noted that emulsion-type polymerization of vinyl compounds is frequently the treatment of choice where high yields and molecular weights are necessary. This is true of acrolein and particularly this is true in the homopolymerization of acrolein where two phase polymerization appears to favor addition polymerization through the double bond rather than the interfering or competing polymerization of the 1,4 variety through the active oxygen of the aldehyde carbonyl group.

The direct prior art picture into which the present invention falls may best be described as polymerizing α, β ethylenically unsaturated aldehydes in an invert water-in-oil (W/O) type emulsion. Many of the process features are old in the art and are described in Welch, ante. For example, the Welch patent describes such features as an inert atmosphere (e.g., $N_2$), a preferred polymerization temperature of about 30° C., separation and recovery of the polyacrolein polymer product in hydrocarbon solvents, etc.

The crux of the present invention lies in the selection of the narrow $C_5$–$C_8$ saturated hydrocarbon cut and components thereof in juxtaposition to the broad range of compounds disclosed in Welch at column 3, line 21 through column 4, line 9. The present invention teaches that the selection of specific compounds such as n-pentane, n-hexane, n-heptane, n-octane, and the isocounterparts such as isohexane, isoheptane, and iso-octane as the nonaqueous diluent or nonsolvent additive permits the utilization of commercially inhibited acrolein. The use of this particular fraction in nowhere suggested in Welch and the prior patent did not solve the problem faced by industry of utilization of commercial acrolein which is inhibited for transport from plants remote from the site of polymerization.

As to the other feature asserted for novelty in the present invention, i.e., the synergistic catalyst system, Welch again only broadly describes redox catalysts in detail at column 5, line 63 through column 6, line 58 and at column 6 lines 44 and 45 as to the redox family specifically prefers the alkali metal persulfate/silver nitrate system. Again, nowhere in Welch is specifically taught the novel combination of the present invention embodying the dual oxidant ammonium persulfate-peroxide/polyacrolein bisulfite adduct described in greater detail post.

In contrast to the many combinations suggested by Welch, the present invention utilizes an oil-in-water (O/W) emulsion, form using a polyacrolein bisulfite adduct as emulsifier and the polymerization of the acrolein occurs in the aqueous phase. The catalyst system is initiated by a unique combination of a soluble redox consisting of a dual oxidant component comprising ammonium persulfate and an active hydroperoxide or peroxide. The present invention involves a synergistic effect in the oxidant combination which is more marked when preferred hydroperoxides are used and is optimum with the use of tertiary alkyl hydroperoxides. A most preferred hydroperoxide of the present invention is tertiary butyl hydroperoxide, and a most preferred ratio persulfate/hydroperoxide is about 4:1 with preferred ratios showing a predominance of the persulfate oxidant component (where ratios are by weight).

The reducing component of the redox is the conventionally prepared polyacrolein bisulfite adduct which also acts as an aqueous emulsifier. In contradistinction to the teachings of the Welch patent noted above, the present invention permits the utilization of commercial hydroquinone inhibited acrolein monomer by the use of the specially selected $C_5$–$C_8$ saturated aliphatic hydrocarbon cut as the nonaqueous diluent. The use of the n-pentane, n-hexane, n-heptane, n-octane, iso-octane, etc., and mixtures thereof, together with the unique combination of the dual oxidant component of the redox, operating synergistically with the bisulfite reducing component are asserted for invention and novelty.

The application contains material related to Kekish, et al., Ser. No. 675,363, now U.S. Pat. No. 3,457,230, granted July 22, 1969.

ACROLEIN MONOMER

The present process permits the utilization of commercially available inhibited acrolein monomer, which is conventionally available in hydroquinone inhibited grades containing 100 p.p.m. hydroquinone and 1,000 p.p.m. hydroquinone. The acrolein monomer is usually inhibited during shipment for safety purposes due to the potential explosive characteristics of the vinyl compound. Utilization of the commercial grade acrolein permits a saving competitively in cost by deleting the hydroquinone removal step from input acrolein in the polymerization process. The present process operates with optimum results for the 100 p.p.m. grade and with operable results for the 1,000 p.p.m. grade of acrolein monomer.

$C_5$–$C_8$ NONAQUEOUS DILUENT

In general with this type of process, an inert water-immiscible organic compound is necessary as a diluent or nonsolvent. The present invention utilizes a nonaqueous diluent which is selected from a narrow range of saturated aliphatic hydrocarbons containing from five to eight carbon atoms and inclusive on n-pentane, n-hexane, n-heptane, n-octane and the corresponding isocompounds. The individual compounds are commercially available, as for example, Skelly-A (n-pentane), Skelly-B (n-hexane), and Skelly-C (n-heptane). It has been found by utilizing this narrow range of nonaqueous diluents that the reaction will go with surprisingly increased yields of clean reaction product and importantly even using the commercial grade hydroquinone inhibited acrolein monomer.

The initial proportion of the nonaqueous diluent can be varied over ranges from about 1 to about 4 parts by weight for 1 part of commercial acrolein monomer. Using the preferred dilution method, an initial 1:1 ratio by weight is utilized, which during the reaction, is sequentially diluted to about a preferred 3:1 diluent: monomer ratio by weight. It has been found that higher proportions of nonaqueous diluent:acrolein can be used operably but to no advantage. On the other hand, sufficient diluent is necessary to adequately disperse the polyacrolein product, and thus the lower limit of about 1:1 is necessary to facilitate control over the polymerization reaction.

INITIAL CONCENTRATION OF WATER

The initial concentration of water used as polymerization medium in this process can vary from about 0.2 to about 2 parts by weight based upon the water:acrolein ratio, with a preferred range of about 0.4 to 1 by weight of water per part of acrolein. It is noted that higher proportions of water to acrolein than those stated above are difficult to disperse in the nonsolvent diluent. The use of less proportions of water may adversely affect the properties of the polyacrolein products so that it is harder and less tractable.

It is essential that in this reaction the aqueous diluent containing the emulsifier be of an acid pH of less than 7 and preferably in the range from about 1.0 to 3. This is achieved by the natural acidity of the bisulfite adduct and the initial acid pH control as by mineral acid addition. It has been found that when the diluent has a pH above 7, unwanted side products caused by condensation polymerization occur and result in the production of a low-molecular weight product.

THE COMPOUND REDOX CATALYST SYSTEM

The present catalyst system involves an improvement over the prior art adapted especially for α, β ethylenically unsaturated aldehydes such as acrolein, preferably, and to methacrolein and α-ethyl acrolein. This system could also be operable in combinations where polymerization is not of the homopolymerization variety, but involves the copolymerization of such an aldehyde with other ethylenically unsaturated monomers such as acrylonitrile, itaconic acid and the like, where the addition polymerization proceeds through the C═C.

Redox systems for unsaturated aldehydes have been known in the past and the current state of the art may well be understood following the teachings of U.S. Pat. No. 3,277,057 (Campanile), particularly at column 2, line 59 through column 3, line 34 setting out free radial oxidants and reducing components. However, it was found that the haphazard use of any redox combination gave rise to certain failings in the product. For example, when homo or copolymerization of acrolein was attempted using ferrous ammonium sulfate as the reducing agent, the polymer disadvantageously retained certain properties of the ferrous/ferric salt combination, such as a yellowish color in the polymer, and was deficient for certain uses, such as dielectric purposes and the paper arts. Again, as to the oxidant component of the redox, no single redox oxidant gave satisfactory results demanded where plant use and economics were contemplated.

It was found that the prior art processes combining persulfate and bisulfite will not produce the results of the present invention. For example, U.S. Pat. No. 3,084,992 (Schlack, et al.) describes an alkali persulfate/alkali bisulfite redox system wherein the bisulfite may be derived from an acrolein bisulfite adduct. It was also found in screening for a better redox system for the aldehyde system that the combination of the tertiary alkyl hydroperoxide/alkali bisulfite adduct was not satisfactory for commercial plant purposes. The explanation for this is not altogether clear. However, it is theorized that it does revolve around the presence of the $HSO_3^-$ ion which apparently in the function as the reducing segment of the redox catalyst requires both of the present oxidant components.

The present invention overcomes many of the difficulties of the prior art which would face a worker in the art, as well as the practical experience leading up to the present invention. Summarily, the present invention, as to the redox system, requires preferably a major amount of ammonium persulfate and a minor amount of a tertiary alkyl hydroperoxide. The selection of the tertiary alkyl hydroperoxide was on the basis of yields pointing towards a synergistic effect wherein these peractivates the greater amount of the ammonium persulfate, so that the two in combination act catalytically with activity greater than their additive effects. Among the preferred tertiary alkyl hydroperoxides which can be utilized for the present invention are tertiary butyl hydroperoxide and tertiary amyl hydroperoxide.

Also in this invention a preferred aryl hydroperoxide, such as cumene hydroperoxide, and operable peroxides, such as lauryl peroxide, benzoyl peroxide dicumyl peroxide, etc., may be used.

The ratio of persulfate/alkyl hydroperoxide may range from about 5:1 to about 1:5 by weight and a most preferred ratio is about 4:1 by weight. The equivalent molar ratio of persulfate/alkyl hydroperoxide is from about 3:1 to 1:3. A most preferred combination for activity for the catalyst in the present invention is ammonium persulfate/tertiary butyl hydroperoxide in the ratio of about 4:1 by weight. Thus although combinations favoring persulfate predominance are preferred, the opposite ratios are operable.

Moreover, the mixed crucial oxidant component of the present invention may have a makeup of a persulfate/hydroperoxide ratio varying from about 5:1 to 1:5. Again, increased synergistic effect of this combination is achieved when the persulfate fraction is superior to the hydroperoxide fraction. Thus an optimum ratio is about 4:1 persulfate/hydroperoxide.

The concentration of the free radical persulfate fraction in the redox may function within wide limits and operable for this invention are the catalyst concentration ranges of the disclosure, U.S. Pat. No. 3,069,389 (Welch) at column 6, line 59 through column 7, line 4; namely, preferred 0.05–2 percent by weight of the acrolein monomer (solids). Additionally, by the present combination redox it has been possible to use lower operable free radical promoters such as a concentration of 2mm. persulfate/M acrolein and with about ¼ as much preferred for the hydroperoxide cosynergist.

The concentration of the reducing agent component can vary, for example, from about 0.5 percent by weight, or lower, to about 10 percent by weight (of solids), or higher, based on the weight of the acrolein monomers; and since the bisulfite adduct acts also as a water-in-oil emulsifier, these ranges are also applicable to its function as an emulsifier.

It has been found that high concentrations of catalysts

CHART I.—POLYMERIZATION OF ACROLEIN IN NON-AQUEOUS DILUENT
[Examples from U.S. 3,069,389, Welch (Union Carbide) and comparison]

| Solvent | ACR-H₂O-solvent ratio | Emulsion type | Per-cent | Acid added | pH | Temp., °C. | Catalyst 1 | Per-cent | Catalyst 2 plus FS | Per-cent | Reaction time, hours | Yield percent |
|---|---|---|---|---|---|---|---|---|---|---|---|---|
| Ex. No.: | | | | | | | | | | | | |
| 1 | Heptane | 1:1.19:3.33 | Arlac.80 | 4.7 | H₂SO₄ | 2 | 5 | CHP | 0.71 | NaHSO₃ | 4.7 | 18 | 48 |
| 2 | Benzene | 1:1:2 | T-NP-14 | 3.3 | H₃PO₄ | | 27 | PP | 0.5 | AgNO₃ | 0.16 | 17 | 40 |
| 3 | Eth. acetate | 1:1:2 | T-NP-14 | 3.3 | ..Same | | 27 | PP | 0.5 | ..Same | 0.16 | 17 | 30 |
| 4 | Dieth. ether | 1:1:2 | T-NP-14 | 3.3 | ...do | | 27 | PP | 0.5 | ...do | 0.16 | 17 | 33.3 |
| 5 | Ethyl. dichl | 1:1:2 | T-NP-14 | 3.3 | ...do | | 27 | PP | 0.5 | ...do | 0.16 | 17 | 33.3 |
| 6 | Heptane | 1:1:2 | | | ...do | | 30 | PP | 0.5 | ...do | 0.1 | 6.5 | 88 |
| 7 | do | 1:0.5:2 | T-NP-14 | 3 | ...do | | 30 | PP | 0.5 | ...do | 0.1 | 6.5 | 74 |
| 8 | do | 1:1:4 | T-NP-27 | 1.9 | ...do | 3.2 | 20 | PP | 0.5 | ...do | 0.1 | 12 | 63 |
| 9 | do | 1:0.5:2.5 | T-NP-27 | 2 | ...do | 2.5 | 20 | PP | 0.5 | ...do | 0.05 | 16 | 65 |
| 10 | do | 1:1:4 | T-NP-27 | 1.9 | ...do | 2.7 | 37–41 | PP | 0.5 | ...do | 0.05 | 8 | 29 |
| 11 | do | 0.5:1:4 | T-NP-27 | 3 | ...do | 3 | 5 | PP | 0.5 | ...do | 0.1 | 27 | 65 |
| 12 | do | 0.5:1:3 | N-T | 0.25 | ...do | 4.5 | 5 | PP | 0.5 | ...do | 0.1 | 31 | 55 |
| 13 | do | 0.5:1:2 | T-NP-27 | 2 | ...do | | 55 | AHP | 1.0 | | | 22 | 17 |
| 14 | do | 0.5:1:2 | T-NP-27 | 2 | ...do | | 55 | ABIBN | 2.0 | | | 23 | 22 |
| Nalco case Heptane [1] | [2] 1:1:1 | PA-NaHSO₃ | 3 | HCl | 1.5 | 30–32 | AP | 0.8 | t-BHP | 0.4 | 8 | 95 |

[1] Acrolein cont. 100 p.p.m. hydroquinone.
[2] Initial.
T-NP-14=Tergitol NP-14.
T-NP-27=Tergitol NP-27.
N-T=N-tallow β-iminodipropinate.
CHP=Cumene hydroperoxide.
PP=Potassium persulfate.
AP=Ammonium persulfate.
FS=Ferrous sulfate.
ABIBN=2-2'azobisisobutyronitrile.
AHP=acetyl hydroperoxide.
t-BHP=Tert. butylhydroperoxide.
Acrolein=Freshly distilled without inhibitor.

particular oxidizing agents were combined. The addition of a minor amount of tertiary alkyl hydroperoxide apparently suabove the upper limit, relative to the concentrations of the acrolein monomers, lead to the formation of undesirable low molecular weight polymers only. Furthermore, concentration of catalysts below the minimum value result in uneconomic, low polymerization rates.

The figure of 95 percent yield for Nalco heptane in chart I above is a consensus from a plurality of runs. In comparison with examples 6, 7, 8, and 9, it is noted that there is a striking superiority in yield running from about 10 percent to about 40 percent. When experiment No. 6 in chart I was repeated as directed by the Welch patent, but this time using 100 p.p.m. inhibited acrolein vice the freshly distilled acrolein of the Welch example, the yield for experiment No. 6 dropped to 56 percent polyacrolein product, whereas in the Nalco heptane process run, similar results using the 100 p.p.m. hydroquinone inhibited acrolein monomer remained at 95 percent polyacrolein product.

GENERALIZED PROCESS OF HOMOPOLYMERIZATION OF INHIBITED ACROLEIN BY INERT EMULSION TECHNIQUE

Step 1. Preparatory to treatment the reactor was purged with nitrogen, vacuum was applied, and then purged again with prepurified nitrogen. Such treatment (i.e., purging and inert atmosphere) is conventional: see U.S. Pat. No. 3,084,992 (Schlack, et al. example 12. Welch U.S. Pat. No. 3,069,389, column 5, lines 53–62, denotes other gases useful in providing an inert atmosphere to prevent oxidation of the acrolein monomer. These gases include carbon dioxide, argon, methane, ethane, and the like.

Step 2. After purging the reactor, 75 parts of DI water was added. (DI water is used so that the dissolved oxygen in the water is removed. Further, in order to completely removed dissolved oxygen from DI water, oxygen can be eliminated by either boiling or purging with nitrogen. Due to the sensitivity of the acrolein, tap water is not operable, but the DI or treated DI water is required.)

Step 3. Fifteen parts of a 20 percent polyacrolein Na bisulfite adduct was added and mixed slowly to insure homogeneous solution. The addition of the acid emulsifier reduced the pH to the acid side (15 parts 20 percent emulsifier). It is noted that for the purposes of the present invention the bisulfite adduct acts both as an emulsifier and as the reducing component for the redox system. Kern, et al. U.S. Pat. No. 3.206,422 teaches the use of the polyacrolein bisulfite adduct as sole emulsifying agent in acrolein polymerization. The emulsifier was prepared by acidifying polyacrolein-NaHSO$_3$ adduct 20 percent with concentrated HCl to reach a pH of 1.5. In the laboratory 100 grams of polyacrolein-NaHSO$_3$ adduct 20 percent (pH 4.4) required 1.1 gram of concentrated HCl to modify the pH to the desired acid value.

Step 4. ordinarily at this point, hydroquinone is added in a small amount to discourage condensation polymerization. Since input in the revised process is inhibited acrolein monomer, this is not necessary.

Step 5. 100 parts of monomeric inhibited acrolein was added to the reactor.

Step 6. 100 parts of n-heptane was added. All dissolved oxygen must be removed from the solvent by purging with nitrogen.

Step 7. The mix was agitated for 15 minutes to make a good emulsion. Dependent upon the rate of agitation and the volume of the vessel particularly, the obtaining of a good emulsion may require more or less time.

Step 8. The ammonium persulfate component was added by dissolving in this case 1.62 parts of ammonium persulfate in 10 parts of DI water and the solution was added slowly over several minutes to the reactor (5 minutes).

Step 9. After a time interval of about 5 minutes, the peroxide oxidant was added. In this case 0.4 parts of tertiary butyl hydroperoxide was added to the reactor.

Step 10. The reactants having been furnished to the reactor, the system was closed and slight nitrogen pressure was applied for the reason stated in 1. A convenient pressure above atmosphere is 2 to 3 p.s.i.

Step 11. The reaction temperature was set at 30° C. and maintained at the optimum 30°–32° during the exothermic polymerization reaction. Control of the temperature during the reaction was by cooling. This temperature is conventional and preferred for invert emulsion polymerization of acrolein. Variations from about 30° C. are discussed in U.S. Pat. No. 3,069,389 (Welch) at column 7, lines 5–12 in connection with this type reaction.

Step 12. By observing the viscosity of the polymerization slurry and noting the formation of large agglomerates, dilute portion wise as needed with nonaqueous diluent purged with nitrogen. During the first 3 hours of the reaction as necessary by over viscosity of the slurry and the presence of large agglomerates, the inert nonaqueous diluent was added incrementally (inert nonaqueous diluent N$_2$ purged). Usually the nonaqueous diluent was added during a period of ½–3 hours from the time of the addition of the catalyst. A total of about 200 additional parts of nonaqueous diluent was added.

This method of the incremental addition of the nonaqueous inert diluent is the preferred method of operation. However, it is possible to commence the operation with the total nonaqueous inert diluent needed. In both methods the total of nonaqueous inert diluent is in about the ratio of water:acrolein:nonaqueous diluent, 1:1:3 and in the incremental method the initial ratio of nonaqueous diluent is about water:acrolein:nonaqueous diluent, 1:1:1 by weight.

Step 13. After 6 hours the reaction was terminated. The time for the homopolymerization reaction for most runs was about 6–8 hours. Again, the time being generally inversely proportional to temperature, the time for this polymerization reaction may vary broadly. For example, as noted in U.S. Pat. No. 3,069,389 (Welch) column 7, lines 13–21, analogous polymerization periods have been noted ranging from about 30 minutes or less to about 100 hours or more, depending upon temperature, catalyst, concentration, etc.

Step 14. After completion of the reaction about 2 parts of sodium bisulfite dissolved in 6 parts water was introduced into the reactor in order to destroy residual catalyst.

Step 15. In order to purify the polymer, a conventional low-aliphatic solvent was utilized. In these particular runs Skelly A, B, and C (Skelly-A, n-pentane; Skelly-B, n-hexane; Skelly-C, n-heptane) in about 250 parts by weight were utilized for this purpose.

Step 16. The precipitate was centrifuged and filtered and washed with n-hexane (Skelly-B) to insure complete removal of nonaqueous diluent from the polymer.

Step 17. The precipitate was air dried and measured for solids concentration.

EXAMPLES

Example 1

Utilizing the general procedure of U.S. Pat. No. 3,069,389 Welch, the polymerization of acrolein was conducted in a water heptane mixture, using catalysts as initiators of polymerization. 100g. of acrolein containing 100 p.p.m. of hydroquinone was mixed with 87.5 ml. of water, 100 ml. of heptane, and 12.5 g. of polyacrolein-sulfurous acid adduct solution (24 percent). The polymerization was initiated with ammonium persulfate and tert. butyl hydroperoxide catalysts. One hundred and fifty ml. of heptane was added during the polymerization to dilute the slurry of polymer and to improve stirring. After 6 hours, the polymer was filtered, washed with heptane, and dried. The yield was 91 percent.

Example 2

Utilizing the technique of example 1 modified for pilot plant operation and using as input 140 lbs. of acrolein charge and an 8-hour reaction time, the following yields of polyacrolein were observed for the following runs:

1. 96% yield
2. 99% yield
3. 99% yield
4. 96.4% yield

Example 3

Comparative. Utilizing the procedure directly according to example 6 of U.S. Pat. No. 3,093,506 Welch in the pilot plant described in example 2 of this invention and utilizing comparative amounts of acrolein monomer containing 100 p.p.m. of hydroquinone and conditions, an average yield for four runs in the pilot plant was 57 of polyacrolein recovery.

Preparation of polyacrolein-NaHSO$_3$ adduct. This procedure utilized 2 parts of sodium bisulfite to 1 part of hydrated polymer.

DI water was added to the reactor in amounts so that the water-solids concentration (hydrated polymer + NaHSO$_3$) would be 35 percent; then 2 parts sodium bisulfite was added while agitating and subsequently 1 part of polyacrolein. The pH was adjusted to a value between 4.0 and 5.0 with 50 percent NaOH and the interior heat in the reactor was held at 90° C. for 1.5–2 hours until all of the polymer dissolved. Subsequently, the reactor was cooled and the solution filtered through the cartridge. The solids content of the product was determined on the moisture balance.

Example 4B

Wet cake preparation. The wet cake of polyacrolein from example 1 after centrifuging and containing approximately 40–50 percent solids, was placed in a reaction vessel. DI water was added and then residual heptane (Skelly-C) was stripped by distillation in vacuo. Solid NaHSO$_3$ was added and the pH of the mixture adjusted to about 4.5. The mixture was heated to 90° C. for about 1 hour. Solubility tests indicated that almost complete bisulfite adduct had been formed from the polyacrolein (99.5 percent).

Example 5

Into a reactor purged with nitrogen was introduced:
100 grams of acrolein monomer (100 p.p.m. hydroquinone inhibited)
12.2 grams of emulsifier polyacrolein-NaHSO$_3$ adduct 24.5 percent pH 1.4
87.8 ml H$_2$O
100 ml. Skelly-B (n-hexane)

The emulsion components were agitated thoroughly for about 30 minutes, and then the two oxidant portions of the redox were added as follows:

Sequentially, 0.815 grams of ammonium persulfate were added to the reaction mix and then 10 drops of tert. butyl hydroperoxide. A 5 min. interval occurred between the initial persulfate addition and the subsequent hydroperoxide addition. The reactor was closed and external heat was applied to bring the internal reactor heat to 30° C. External cooling was then administered to keep the reaction at 30°± 2° C. for 5 hours. During the first 3 hours, additional n-hexane was introduced incrementally in 50 and 25 ml. portions at 30 minute intervals. At the end of 6 hours the reactor was opened at the polyacrolein precipitate was filtered and washed with Skelly-A (n-pentane). The polyacrolein (PAC) was obtained in 94.5 percent yield.

Example 6

The generalized procedure of example 5 was followed in each case below using the following reaction conditions: 100 g. acrolein (Union Carbide —100 p.p.m. hydroquinone inhibited); 3 percent emulsifier polyacrolein-NaHSO$_3$adduct, pH 1.5; temperature 30°–32° C; 0.815 percent Am. persulfate, 0.4 percent T-BHP initial acrolein:water:solvent ratio 1:1:1; dilution with more solvent. Initial solvent 100 ml.

| Solvent | Total Solvent (Ml) | Rec. Time Hrs. | 70 Yield |
|---|---|---|---|
| Skelly-C heptane | 200 | 6 | 93 |
| Skelly-B (hexane) | 250 | 6 | 94 |
| Skelly-A pentane | 250 | 6 | 97 |
| Iso-octane | 250 | 6 | 94.5 |
| Isohexane | 250 | 6 | 92 |

DEFINITIONS

The term "polymerizing" under normal inert conditions" is defined under the present specification and claims to mean polymerizing in an inert atmosphere (e.g., N$_2$) under the temperature conditions set out in this specification and preferably about 0°–40° C. at a slight positive pressure above 1 atmosphere (+1-5pounds per square inch), and using a final weight ratio of acrolein:water:nonaqueous diluent of preferably about 1:1:3 and ranging upward to about 1:1:5.

The terms "nonaqueous diluent" and "nonsolvent" used in the art are synonymous for purposes of this specification and claims, and these terms refer to the oil and/or discontinuous phase of the termed "inverted water-in-oil (W/O) emulsion."

The embodiments of the invention in which an exclusive property or privilege is claimed are define as follows:

1. In a process for emulsion homopolymerization of an α β ethylenically unsaturated aldehyde monomer by means of a water-in-oil invert emulsion, the improvements which comprise using as the nonaqueous diluent a saturated aliphatic C$_5$-C$_8$ hydrocarbon and using as a polymerization addition catalyst a redox system consisting of an oxidant component comprising a major amount of ammonium persulfate and a minor amount of active organic peroxide and a reducing component comprising a polyacrotein bisulfite adduct, and polymerizing under normal inert conditions, separating and recovering the α β ethylenically unsaturated aldehyde polymer.

2. The process of claim 1 wherein the α β ethylenically unsaturated aldehyde is acrolein.

3. The process of claim 1 wherein the nonaqueous diluent is hexane.

4. The process of claim 1 wherein the nonaqueous diluent is heptane.

5. The process of claim 1 wherein the nonaqueous diluent is octane.

6. The process of claim 1 wherein the nonaqueous diluent is pentane.

7. The process of claim 1 wherein the peroxide is tertiary butyl hydroperoxide.

* * * * *